United States Patent [19]

Watanabe

[11] 4,023,402
[45] May 17, 1977

[54] UNIT TYPE STRAIN GAUGE

[75] Inventor: Osamu Watanabe, Tokyo, Japan

[73] Assignee: Kyowa Electronic Instruments Co., Ltd., Chofu, Japan

[22] Filed: Dec. 31, 1975

[21] Appl. No.: 645,892

[30] Foreign Application Priority Data

Feb. 22, 1975 Japan .............................. 50-22266

[52] U.S. Cl. .............................. 73/88.5 R; 338/2; 338/5
[51] Int. Cl.² .......................................... G01B 7/16
[58] Field of Search .................. 73/88.5 R; 338/2, 5

[56] References Cited

UNITED STATES PATENTS

| 3,134,953 | 5/1964 | Eisler | 73/88.5 R |
| 3,445,800 | 5/1969 | Ambulos et al. | 338/2 |
| 3,639,875 | 2/1972 | Brewer | 338/2 |
| 3,986,254 | 10/1976 | Norostrom | 73/88.5 R |

Primary Examiner—James J. Gill
Assistant Examiner—Anthony V. Ciarlante

[57] ABSTRACT

A unit type strain gauge having a protective outer casing of a hard material provided with an internal space open at one side and a pressing member housed in the internal space arranged to press a strain gauge element attached to it against an object, in which strain is to be measured, the remainder of said space being filled with soft synthetic rubber arranged to maintain the parts of the gauge in position and to maintain a dust proof and moisture proof structure.

14 Claims, 17 Drawing Figures

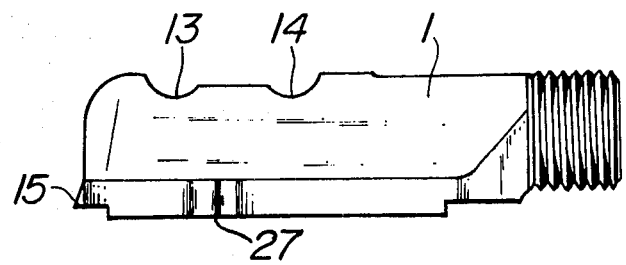
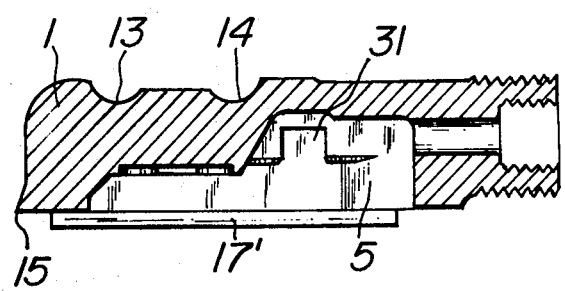
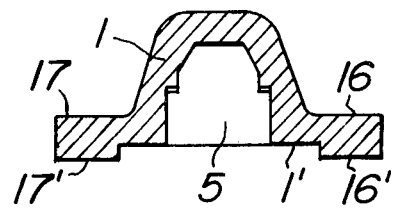
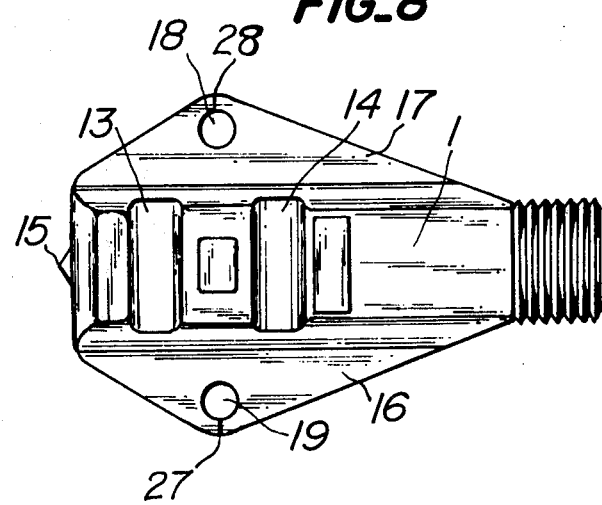

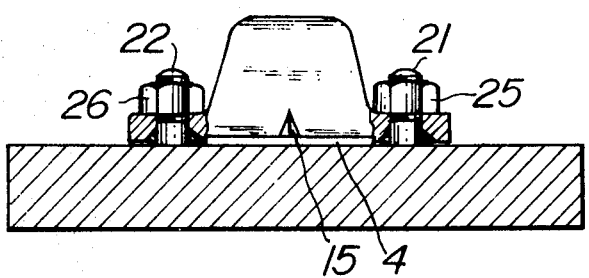
FIG._12
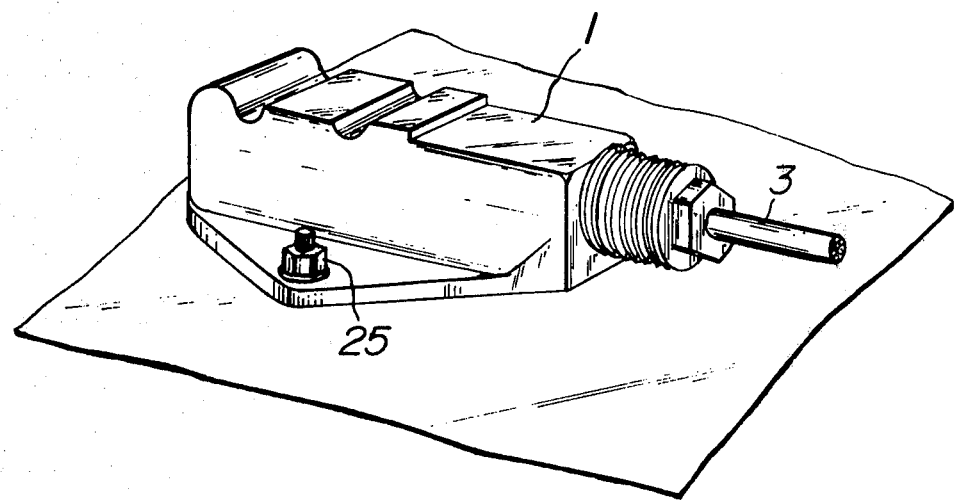
FIG._13

FIG_14
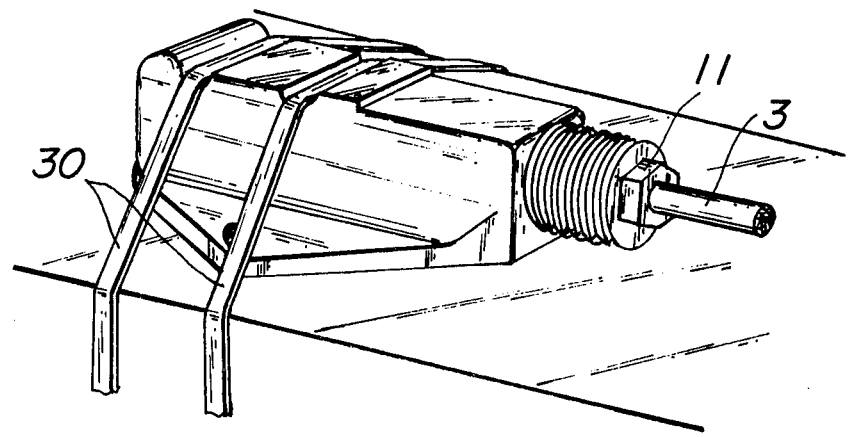
FIG_15
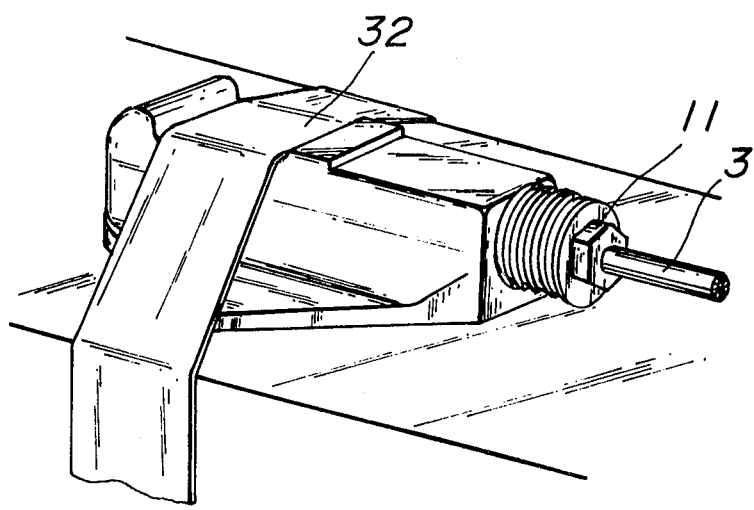
FIG_16
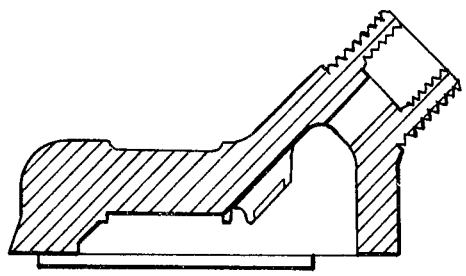

UNIT TYPE STRAIN GAUGE

BACKGROUND OF THE INVENTION

1. Field of the Invention

The present invention relates to a unit type strain gauge which can be mounted very simply on an object, in which strains are to be measured and easily manufactured in a dust proof and water proof construction.

2. Description of the Prior Art

In the use of the strain gauge such as for the measurement of dynamic strain in railway lines or for the measurement of vehicle weight by mounting the gauge on the shaft of the vehicle, a plurality of strain gauges are used by mounting them on metal parts of the object, in which strains are to be measured. Generally such work is carried out outdoors so that an easy and laborsaving form of mounting is required. Furthermore, for obtaining high accuracy of measurement, rigid mounting of the gauge element, dust proof and water proof characteristics are required.

There is a prior proposal of the present applicant concerning the protection of strain gauges, (Japanese Utility Model No. 1,043,254), in which a protector is used to protect a strain gauge mounting portion on an outdoor structure by providing a dust proof and water proof protecting structure over a strain gauge element mounted on an object. This protector has the drawback that considerable time is required for mounting it because when applying the protector, the strain gauge element is first mounted on an outdoor structure, then lead wires are connected between the element and a connecting cord terminal and finally the protector cover is mounted to establish a water proof construction. The mounting of the strain gauge element on an outdoor object using this known protector is especially difficult during rain.

In more detail, the mounting of the strain gauge element when using said known protector required the following working steps.

a. grinding a surface of the object under test for removing rust and stain.
b. cleaning up the surface by means of a cleaning agent such as toluene.
c. affixing the strain gauge element by using an adhesive.
d. pressing the strain gauge element by means of a pressure applying rubber plate and a pressing metal plate.
e. removing the pressing metal plate and the pressure applying rubber plate after hardening of the adhesive.
f. applying a coating agent to the strain gauge element.
g. mounting a packing member attached to a connecting cable.
h. providing electric connections between the conductors of the connecting cable and the terminals of the strain gauge element.
i. applying an insulative protecting compound to the strain gauge element surrounded by the packing member.
j. placing the protector cover on the compound and pressing it until hardening of the compound.

The mounting of a strain gauge element using the protector cover required several hour's work for the completion of the above steps. During rain, the work is difficult and may require other additional preparations.

There is another proposal in this art that has been disclosed by a British company Rotax Limited for a converter used for measuring the weight of a vehicle. FIGS. 1 to 3 show the construction of a converter made by Rotax Limited.

In the exploded view shown in FIG. 1, two stud bolts 102 and 102' are fixed to a surface 101 of an object in which strains are to be measured by means of welding as shown by 103. A sensing element 105 is mounted on the stud bolts 102 and 102' by means of mounting holes 106 by inserting the bolts in the holes by using two O rings 104. The sensing element 105 is provided with a strain gauge element 107. The strain gauge element 197 is electrically connected to cable conductors 109 at the terminal 108 and is coupled to an external measuring equipment (not shown) through a cable 110. A protecting case 111 is provided to surround the element 105 and an upper cover 112 is mounted on it via a packing 113 and secured by means of four screws 114.

FIGS. 2 and 3 show in more detail the sensing element 105. The body of the sensing element 105 is made in a "cranked" shaped and on both surfaces of the middle portion the gauge elements 107 are adhered and connected to a terminal 108 by means of a gauge lead wire 115. The sensing element 105 is rigidly fixed by means of nuts 116 against the stud bolts 102 and 102'. In this structure, a strain on the surface of the object 101 is conveyed to the sensing element 105 through the stud bolts 102 and 102'. Accordingly, the spacing of the two stud bolts should be made to coincide precisely with that of the mounting holes 106. In practice, this accuracy should be of the order of ±5/100 mm (±0.002 inch). Therefore, for this operation expensive jigs and tools and high quality welding are required. For this reason the use of the device is quite limited. Furthermore, in this construction a number of constituent elements are required and hence the device becomes expensive. In addition, since the sensing element 105 has a certain amount of mass and then has an inherent resonant frequency which reduces the frequency response of the element and it does not respond to a sudden shock. Also the case 11 has a breathing effect and hence the structure does not provide complete protection of the gauge against moisture.

SUMMARY OF THE INVENTION

The present invention has for its object the mitigation of the aforementioned disadvantages of known constructions and to provide a unit type strain gauge which can be very easily mounted and which has a dust proof and moisture proof structure of very low cost.

BRIEF DESCRIPTION OF THE DRAWINGS

FIGS. 1 to 3 show an embodiment of conventional strain detecting converter, in which;
 FIG. 1 is a perspective exploded view;
 FIG. 2 is a plan view of an essential part thereof; and
 FIG. 3 shows a side view of the same.
FIGS. 4 to 10 show an embodiment of the unit type strain gauge according to the present invention, in which;
 FIG. 4 is a vertical cross-sectional view;
 FIG. 5 is a bottom view;
 FIG. 6 is a side view;
 FIGS. 7a and 7b are vertical cross-sectional views cut from two orthogonal directions of an outer casing thereof;

FIG. 8 is a plan view thereof;

FIG. 9 is a bottom view of the same;

FIG. 10 is a plan view and side cross-sectional view of the packing;

FIGS. 11 to 15 are drawings illustrating the manner of use of a unit type strain gauge according to the present invention; and FIG. 16 is a cross-sectional view of a modified embodiment of the unit type strain gauge according to the present invention.

DESCRIPTION OF THE PREFERRED EMBODIMENTS

The invention will now be described by reference to the accompanying drawings.

Figure 9:
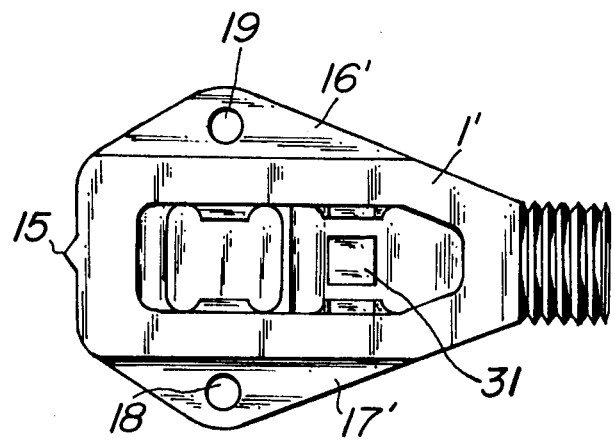
Figure 10:
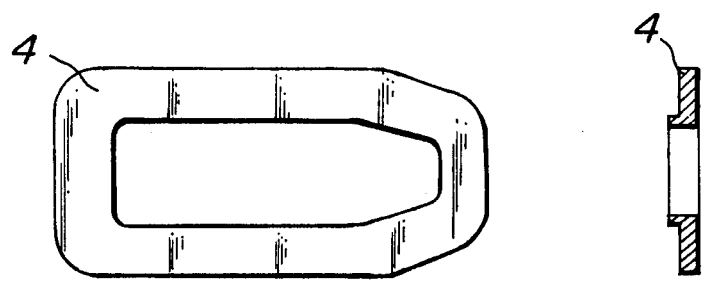

In the drawings, corresponding parts are indicated by using identical reference numerals. As shown in FIGS. 4 to 10, a hard protective casing 1 made of for instance cast iron or die cast zinc or aluminium has a threaded inlet opening 2 mated with a fastening screw 11 for inserting a connecting cable such as a captire cord 3. The base surface 1' of the protective outer casing 1 may be made flat. However, in a preferred embodiment of the present invention as illustrated in the drawings, the base surface 1' is provided with two raised flange portions 16' and 17' as shown in FIGS. 7a, 7b and 9. A packing 4 of a few millimeter thickness is adhered onto the base surface 1' using the raised flange portions 16' and 17' as the guides for accurately fixing the packing 4 in place. The height of the raised flange portions 16' and 17' and the thickness of the packing 4 are so arranged as the packing 4 slightly project from the surface of the flange portions for instance, by 0.5-1.5 mm, preferably 1 mm. The height of projection of the packing 4 corresponds to the amount of compression of the same when the casing is fully pressed against an object in which strains are to be measured since the raised flange portions 16' and 17' act as stoppers and prevent further compression of the packing 4.

An internal space 5 is provided in the middle bottom portion of the outer casing 1 and a pressing member 6 formed of for instance a synthetic rubber block cut from a neoprene sheet is fixed for instance by adhesive. The member 6 can be made of a uniform thickness with the necessary accuracy by cutting it from a neoprene sheet. A standard sheet having 1 cm thickness can be used conveniently.

A strain gauge element 7 is adhered to the bottom surface of the pressing member 6. The strain gauge element is known per se and it may be formed in various sizes and types and may be one unit or a combination of 2 to 4 units in the known manner. The adhesion of the strain gauge element 7 to the pressing member 6 is only to fix the position of the gauge element and as the pressing member 6 is formed of an elastic material having much less stiffness compared with that of the base of the strain gauge element 7, any strain in the pressing member 6 will not exert an influence on the output of the strain gauge element 7.

The outer surface of the base of the strain gauge element 7 is so arranged as to slightly project downwardly from the surface of the packing 4. The amount of projection may be less than 1 mm and more than 0.2 mm and suitably about 0.3 mm to 0.5 mm. However this amount is not critical owing to selection of hardnesses of the elastic materials as will be explained later. It should be noted that the sizes explained above are just to help a better understanding of the idea of the invention. The sizes are for the embodiment of the gauge illustrated in FIGS. 4–10 or 16 in actual size.

The respective branch elements of the strain gauge element 7 are connected to the respective terminals of a terminal member 9 by means of ribbon wires 8 or the like so as to form a desired bridge connection which, in turn, is connected to cable wires 10 of a lead cable 3 at the terminal 9. The lead cable 3 is held in position by tightly fastening the screw 11 against bottom shoulder of the inlet opening 2 by using an O ring 12. The lateral crush of the O ring will hold the cable 3 rigidly in position. This structure is useful also for the realization of the water proof construction. By the provision of said holding means an outer force applied to the lead cable 3 will not be transferred to the terminal 9.

Figure 5:
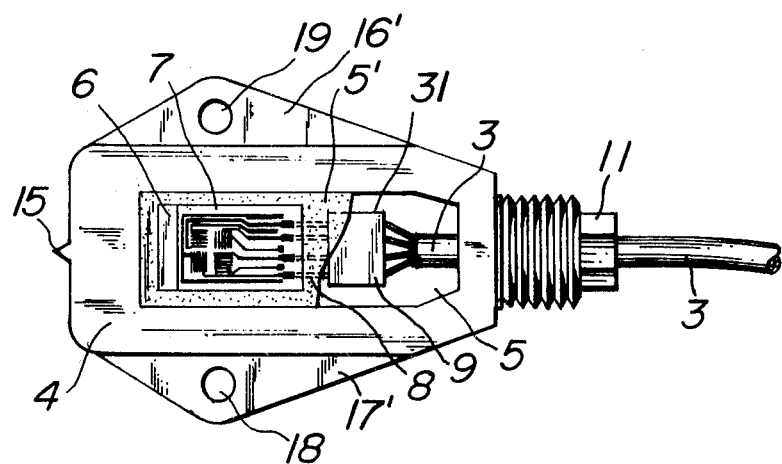

The part of the internal space 5 for accommodating the terminal 9 is shaped to match the outer shape of the terminal member 9 as indicated by reference numeral 31 in FIGS. 5, 7a and 9. This will help to maintain the terminal member 9 accurately in place.

The embodiment shown in FIG. 5 represents a set of four strain gauge units having measuring axes intersecting normally with each other. After completing the aforementioned arrangement, the remainder of the space 5 is filled by leaving a small space for compression with soft synthetic rubber material 5' such as for instance silicone rubber, vulcanized synthetic rubber or the like which is much softer than the pressing member 6. In order to show the elements housed in the internal space 5, the soft synthetic rubber material 5' is shown only in part in FIGS. 4 and 5. But it should be noted the substantial portion of the internal space 5 is filled by the material 5' and it forms a flat outer surface. By filling up the substantial volume in the internal space 5 with the soft synthetic rubber material 5', the constituent elements such as the terminal member 9 and the end portion of the lead cable 3 are firmly held in position in the protective casing 1 so that no other securing means such as screws and nuts are required. This will much decrease the cost for the parts and the work involved in assembly. At the same time a dust proof and moisture proof structure results.

It is most important to select the hardness of the three elastic materials, i.e. the pressing member 6, the packing 4 and the soft synthetic rubber filling 5' in the remainder of the space 5, at suitable relationship in conjunction with the amount of compression of the packing 4 and the pressing member 6 for obtaining good result by the present invention. The following values shown in "Shore hardness" will give a good result in the embodiment of the present invention.

1. hardness of pressing member: 60 – 70
2. hardness of packing: about half of the above value or about 30
3. hardness of space filling soft synthetic rubber: less than about 1/5 of that of the packing or less than 6.

By the selection of hardness in the above range the strain gauge element 7 can be suitably pressed against to an object when the gauge is mounted on the surface and applied with a large pressure by fastening the mounting screw. The packing 4 keeps good isolation to protect the element from outer moisture.

Figure 4:
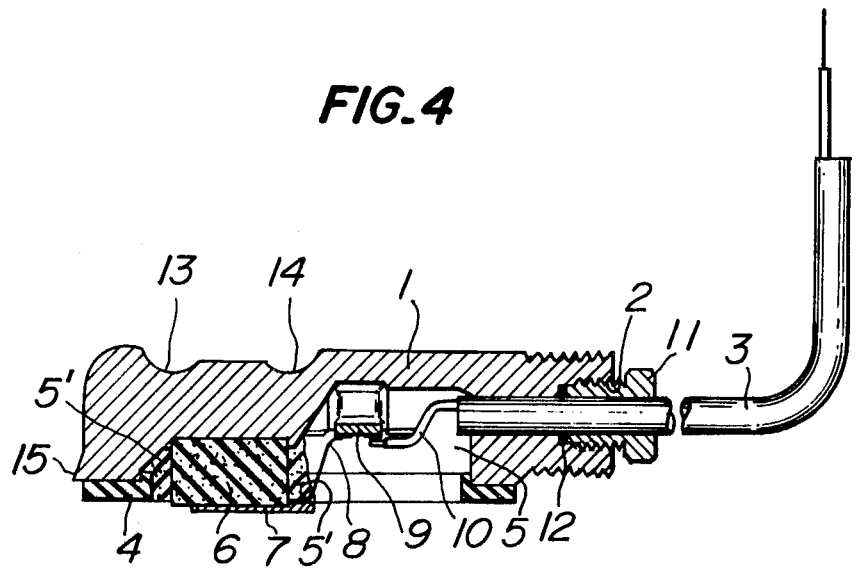

Grooves 13 and 14 are provided on the upper side of the protective casing 1, a projection 15 for indicating the direction of the main gauge axis is provided on the end of the casing 1 and this is shown at the left side in FIG. 4. At both sides of the casing 1, two flanges 16 and 17 are provided as can be better seen in FIG. 8 and bolt holes 18 and 19 are provided therein.

The manner of use of the unit type strain gauge of the present invention will be explained hereinafter.

Figure 11:
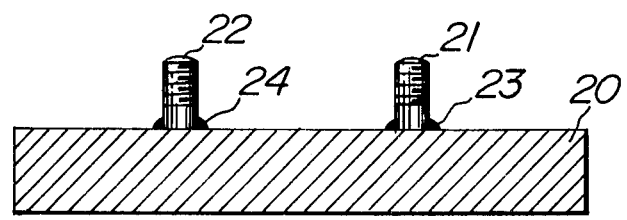

As can be seen in FIGS. 11 and 12, two stud bolts 21 and 22 are secured to an object 20 in which strains are to be measured by welding at the respective welding portions 23 and 24. Then the underside of the gauge element 7 is caused to adhered to the object 20 by means of a suitable adhesive as can be seen in FIG. 12. The casing 1 is secured by fastening nuts 25 and 26 to the bolts 21 and 22. FIG. 13 shows a perspective of such an arrangement. By fastening the nuts 25 and 26, the strain gauge element 7, which was projecting slightly from the surface of the raised flange portions 16' and 17' with the aid of the packing 4, for instance projecting by 0.5–1.0 mm, is suitably pressed against the surface of the object 20. The raised flange portions 16' and 17' may help to apply a uniform compression for the packing 4 and the element 7.

Figure 1:
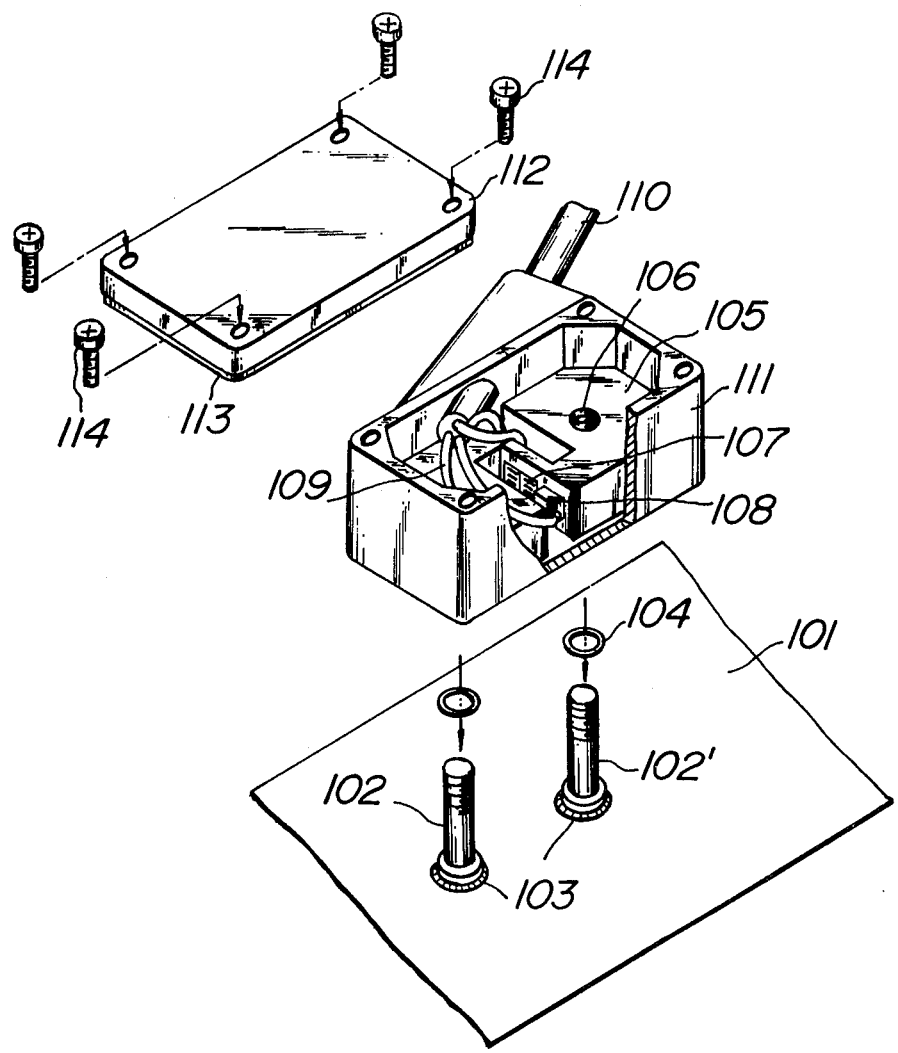
Figure 2:
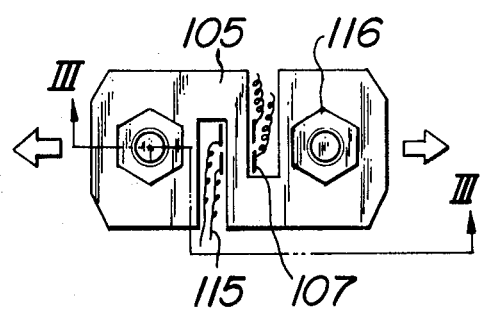
Figure 3:
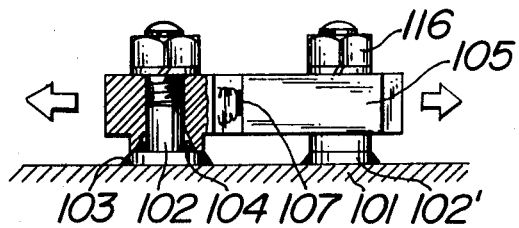

It should be noted that in the unit type strain gauge according to the present invention, the strain in the object 20 is directly transferred to the strain gauge element 7 by means of the direct adhesive mounting thereon and this transfer is not an indirect transfer as in the case of the known embodiment shown in FIGS. 1 to 3. Due to the direct transfer of the strain to the gauge element, the gauge will not have an intrinsic frequency due to the mass of the sensing element so that the frequency response characteristics can be substantially improved.

Furthermore, in the embodiment according to the present invention, the pressing element 6 presses the gauge element 7 to the object 20 during adhesion and maintains the condition after the completion thereof. Accordingly, the stud bolts 21 and 22 do not act to convey the strain in the object to the gauge but act only to press the protecting casing against the object 20 and to keep it in position. This means that a considerably large plays or tolerances may be permitted for the determination of the position of the bolts 21 and 22 and the holes 18 and 19. Therefore, assembly by means of the stud bolts 21 and 22 is much easier than in the case of the known device as mentioned above.

The protective casing 1 may be provided with marks 27 and 28 at both sides thereof as illustrated in FIGS. 6 and 8. This is convenient for placing the gauge on an object, the marks 27 and 28 being matched with an indication line provided on the object.

As has been mentioned in the foregoing, after installing the stud bolts 21 and 22 on the object the device can be mounted in a single operation.

FIGS. 14 and 15 show alternative ways of the mounting a device according to the present invention. The unit type strain gauge may be mounted without the provision of the two stud bolts by welding. FIG. 14 shows mounting by using a wire 30 and FIG. 15 shows mounting by using a securing belt 32.

FIG. 16 shows a different embodiment of the outer casing which has the lead cable inlet bent upwardly.

In the aforementioned embodiment, the lead cable 3 is inserted in the protective casing 1 through a hole 2, however, the bottom portion of the hole 2 may be cut open and the lead cable 3 may simply be placed in the desired location without passing it through a hole.

If the outer surface of the object in which strains are to be measured is cylindrical, the packing 4 may be modified to have a curved outer surface to fit the curvature of the surface of the object and the gauge can be mounted in exactly the same manner as mentioned above.

This gauge has advantages in its very cheap manufacturing cost and in the ease with which it may be mounted and in addition, it has improve characteristics in respect preventing the admission of dust and moisture.

The unit type strain gauge can conveniently be used for the measurement of weight or the detection of load imbalances of a goods wagon by mounting the gauge on the side of a rail. Also it can be used for measuring the weight of a truck.

What is claimed is:

1. A unitary strain gauge comprising: a protective outer casing made of a hard nondeformable material having means for fastening to an object in which strains are to be measured, an internal space open at one side and a lead cable inlet at one end of the casing, a peripheral packing having a surface to fit the open side of the casing and another surface to fit an outer surface of the object in which strains are to be measured, a pressing member made of an elastic material arranged in the internal space of the casing in such a manner than one surface thereof slightly projects from outer face of the packing, a strain gauge element mounted on the projecting surface of the pressing member, a terminal member having ribbon wires for providing electric connection to the strain gauge element and terminals for providing electric connection for wires of a lead cable, the remainder of the inner space of the casing being substantially filled by an elastic material in an extent sufficient to keep said pressing member, said terminal element and a portion of said lead cable in position and to provide dust proof and water proof construction the hardness of said pressing member being higher than that of said packing and the hardness of said packing being greater than said filling material, whereby fastening of said casing to said object results in firm compression of said pressing member against said strain gauge element and fixing of the elements within said casing on forming a firm peripheral packing seal.

2. A unit type strain gauge as claimed in claim 1, wherein the protective outer casing is made of cast iron.

3. A unit type strain gauge as claimed in claim 1, wherein the protective outer casing is made by die casting from aluminium, zinc or the like.

4. A unit type strain gauge as claimed in claim 1, wherein the protective outer casing has two flanges, one extending at each side of the bottom surface thereof and each of the flanges is provided with a hole for mounting bolt.

5. A unit type strain gauge as claimed in claim 1, wherein the protective outer casing is provided with at least one groove at the top thereof for securing the gauge to an object in which strains are to be measured by a binding means.

6. A unit type strain gauge as claimed in claim 1, wherein the outer casing is provided with indication means for showing direction of mounting of the gauge.

7. A unit type strain gauge as claimed in claim 1, wherein the pressing member is made of a synthetic material such as silicon rubber, vulcanized synthetic rubber and its one surface is arranged to extend about 1 mm from the outer surface of the packing.

8. A unitary stain gauge comprising; a protective outer casing made of a hard material having an internal space open at one side and a lead cable inlet at one end of the casing, wherein said open side is made substantially flat surface having step shaped projecting flanges, a packing located within said step flanges having a surface to fit the open side of the casing and another surface to fit an outer surface of an object in which strains are to be measured and having thickness to slightly project from the surface of the step shaped projecting flanges, a pressing member made of an elastic material arranged in the internal space of the casing in such a manner that one surface thereof very slightly projects from outer face of the packing, a strain gauge element mounted on the projecting surface of the pressing member, a terminal member having ribbon wires for providing electric connection to the strain gauge element and terminals for providing electric connection for wires of a lead cable, the remainder of the inner space of the casing being substantially filled by an elastic filling material in an extent sufficient to keep said pressing member, said terminal element and a portion of said lead cable in position and to provide dust proof and water proof construction, pressing member having a Shore hardness between 60 to 70, the packing a Shore hardness about half of said value and the filling material a Shore hardness about 1/5 of that of the packing member.

9. A unit type strain gauge as claimed in claim 8, wherein the protective outer casing is made of cast iron.

10. A unit type strain gauge as claimed in claim 8, wherein the protective outer casing is made by die casting from aluminium, zinc or the like.

11. A unit type strain gauge as claimed in claim 8, wherein the protective outer casing has two flanges, one extending at each side of the bottom surface thereof and each of the flanges is provided with a hole for mounting bolt.

12. A unit type strain gauge as claimed in claim 8, wherein the protective outer casing is provided with at least one groove at the top thereof for securing the gauge to an object in which strains are to be measured by a binding means.

13. A unit type strain gauge as claimed in claim 8, wherein the outer casing is provided with indication means for showing direction of mounting of the gauge.

14. A unit type strain gauge as claimed in claim 8, wherein the pressing member is made of a synthetic material such as silicon rubber, vulcanized synthetic rubber and its one surface is arranged to extend about 1 mm from the outer surface of the packing.

* * * * *